US010512119B2

(12) United States Patent
Arrizza et al.

(10) Patent No.: US 10,512,119 B2
(45) Date of Patent: Dec. 17, 2019

(54) SHARED RESOURCE CAPACITY AMONG DEVICES

(71) Applicant: GreatCall, Inc., San Diego, CA (US)

(72) Inventors: John Arrizza, Oceanside, CA (US); Joel Stair, San Diego, CA (US); Gavin Sermona, San Diego, CA (US)

(73) Assignee: GreatCall, Inc., San Diego, CA (US)

( * ) Notice: Subject to any disclaimer, the term of this patent is extended or adjusted under 35 U.S.C. 154(b) by 0 days.

(21) Appl. No.: 15/828,016

(22) Filed: Nov. 30, 2017

(65) Prior Publication Data

US 2019/0166649 A1 May 30, 2019

(51) Int. Cl.
| | |
|---|---|
| *H04W 88/04* | (2009.01) |
| *H04W 4/02* | (2018.01) |
| *H04W 52/02* | (2009.01) |
| *H04W 28/16* | (2009.01) |
| *H04M 15/00* | (2006.01) |
| *H04W 4/90* | (2018.01) |
| *H04W 4/24* | (2018.01) |
| *H04W 4/70* | (2018.01) |

(52) U.S. Cl.
CPC ........... *H04W 88/04* (2013.01); *H04M 15/56* (2013.01); *H04M 15/765* (2013.01); *H04W 4/02* (2013.01); *H04W 4/24* (2013.01); *H04W 4/90* (2018.02); *H04W 28/16* (2013.01); *H04W 52/0212* (2013.01); *H04W 4/70* (2018.02)

(58) Field of Classification Search
CPC ........... H04W 4/02; H04W 4/16; H04W 4/30; H04W 4/80; H04W 4/90; H04W 76/15; H04W 88/06; H04W 88/08; H04W 8/005; H04W 28/0215
See application file for complete search history.

(56) References Cited

U.S. PATENT DOCUMENTS

| | | | |
|---|---|---|---|
| 8,219,431 B2* | 7/2012 | Maeda | G06Q 10/10 705/7.13 |
| 8,489,066 B2 | 7/2013 | Imming et al. | |
| 2009/0213771 A1* | 8/2009 | Celentano | H04L 5/0053 370/310 |
| 2010/0167719 A1* | 7/2010 | Sun | H04W 36/0088 455/423 |
| 2015/0245393 A1* | 8/2015 | Lee | H04W 8/005 370/338 |
| 2015/0365902 A1* | 12/2015 | Ur | H04W 52/0251 455/418 |
| 2018/0040255 A1* | 2/2018 | Freeman | A61M 16/0078 |
| 2018/0076492 A1* | 3/2018 | Chaturvedi | H01M 10/48 |
| 2018/0213478 A1* | 7/2018 | Baron | H04L 67/303 |

* cited by examiner

*Primary Examiner* — Mohamed A Kamara
(74) *Attorney, Agent, or Firm* — Kilpatrick Townsend & Stockton LLP

(57) ABSTRACT

Communications devices such as cellular telephones share resources, for example to conserve battery capacity or to enable a device to perform a function not available to another one of the devices. Such devices may find particular utility in a mobile personal emergency response (MPERS) environment, and may enable clients of an MPERS service to take better advantage of the service. The devices communicate over a local wireless communications system to determine which device may perform a particular function. Other resources that may be shared include cellular connectivity and global positioning capability.

19 Claims, 7 Drawing Sheets

SHARED RESOURCE CAPACITY AMONG DEVICES

BACKGROUND OF THE INVENTION

Various devices and systems have been developed for providing remote assistance to individuals. Such systems are sometimes called mobile personal emergency response systems (MPERS). Typically, a client of such a service enrolls in the service and provides emergency contact information to the provider of the service. The client carries a mobile device such as a specially-programmed cellular phone or another kind of device for contacting the service provider. When the client needs assistance, he or she uses the device to contact the service provider, who can answer questions, provide assistance such as navigational assistance, or summon help for the client if needed. For example, the service provider may contact one of the client's emergency contacts, or may summon official emergency response personnel.

However, the usefulness of such a service is lost if the mobile device is unable to communicate with the service provider, for example because the device has insufficient battery charge, because it cannot connect with the cellular phone system, or because some other resource is unavailable when needed.

There is a need for providing a mobile device access to additional resources.

BRIEF SUMMARY OF THE INVENTION

According to one aspect, a communications device comprises a wide area communications interface, a local wireless communications interface, processor, memory, and a battery. The battery is configured to power the wide area communications interface, the local wireless communications interface, the processor, and the memory. The memory holds instructions that, when executed by the processor, cause the communications device to establish a connection with a second device via the local wireless communications interface, and send, via the local wireless communication interface to the second device, a request for the second device to perform the particular function on behalf of the communications device. The instructions further cause the communications device to receive, via the local wireless communication interface from the second device, an indication that the second device will perform the particular function on behalf of the communications device.

DETAILED DESCRIPTION OF THE INVENTION

The ensuing description provides preferred example embodiment(s) only, and is not intended to limit the scope, applicability or configuration of the disclosure. Rather, the ensuing description of the preferred example embodiment(s) will provide those skilled in the art with an enabling description for implementing a preferred example embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments. Furthermore, embodiments may be implemented by manual techniques, automatic techniques, or any combination thereof.

Figure 1:
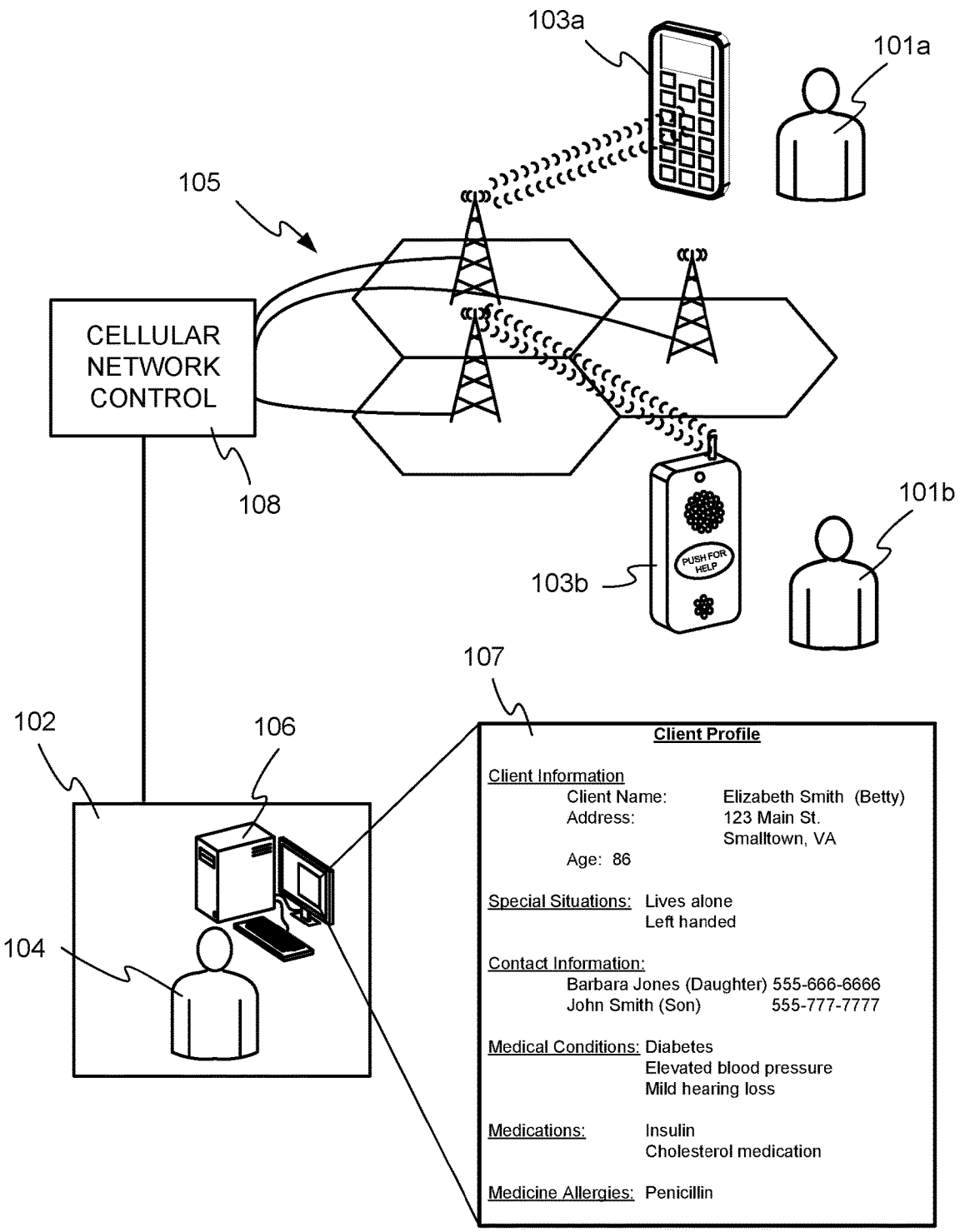
FIG. 1 illustrates the operation of a telephone-based assistance service with which embodiments of the invention may find utility.

Embodiments of the invention may find particular utility in conjunction with an assistance service, as depicted in FIG. 1. In the example arrangement of FIG. 1, clients 101a and 101b of a private response center (PRC) 102 use their portable electronic devices 103a and 103b to reach PRC 102. PRC 102 may be operated, for example, by a response service provider who offers personalized assistance to clients who subscribe to the service. In some embodiments, the response service provider may offer personal health management advice, concierge services, navigational assistance, technical support for telephones used in conjunction with the service, or other kinds of personalized services deliverable by telephone. PRC 102 may be staffed by customer service representatives 104 who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package. Although PRC 102 is shown as a staffed service, in other embodiments PRC 102 may also be a fully automated system, self-service website, mobile application, or similar.

In one example scenario, the service provider that operates PRC 102 may also be a cellular telephone service provider, and may offer a private assistance service as an adjunct to cellular telephone service. PRC 102 can be contacted through a phone number, speed dial or other shortcut, for example by activating a 5 and * key combination on a telephone, by activating an application on a smart phone, or by other methods. FIG. 1 illustrates contacting PRC 102 using cellular devices through cellular network 105, controlled by a cellular network controller 108, but clients of PRC 102 may reach PRC 102 by other means as well, for example via conventional wire line telephone, using a voice-over-Internet-protocol (VOIP), or any other suitable connection method that enables a user to reach PRC 102. PRC 102 may be reachable via multiple methods.

While embodiments of the invention are described primarily in the context of a private response center, the invention is not so limited and may be embodied with a public facility, or in other applications beyond personal assistance.

PRC 102 includes a computer system 106 that may be used for various functions. For example, information about calls from clients may be displayed to customer service representative 104. Computer system 106 may store personal information gathered from clients that may be helpful in rendering assistance to the clients. Computer system 106 may assist customer service representative 104 in the performance of his or her job, for example automating telephone dialing and the like. While computer system 106 is illustrated as a single computer, it will be recognized that the term "computer system" encompasses many different kinds of installations, including systems of multiple computers linked together. The multiple computers may be co-located or widely dispersed. In other embodiments, computer system 106 may be implemented using a mobile device, service, or application, or other Internet service.

Computer system 106 may also store a personal profile of each client. For example, upon enrollment in the service provided by PRC 102, a client may provide information about his or her medical conditions, medications, and other information that may assist PRC 102 in assisting the client. The client may also provide contact information for family members or other entities that can be contacted in the event of an emergency, or who are to be informed about the health and well-being of the client. An abbreviated example personal profile 107 is shown in FIG. 1. Upon receiving a call from a client of PRC 102, computer system 106 may display the client's personal profile to the customer service representative handling the call, so that the customer service representative can better assist the client, and can immediately identify contacts who may need to be notified of the call or included in a response to the call.

Figure 2A:
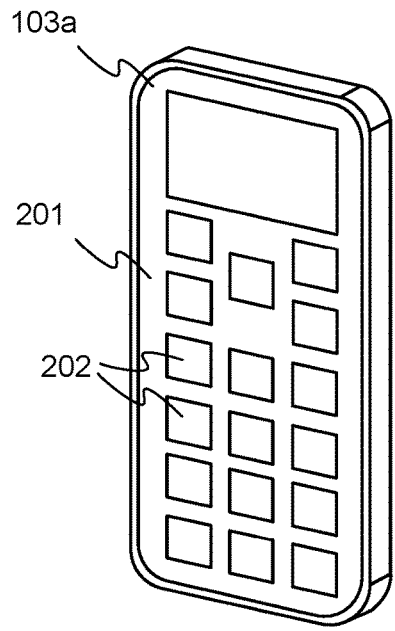
FIGS. 2A-2C illustrate communication devices usable in embodiments of the invention.

FIG. 2A illustrates example cellular telephone 103a in more detail. Cellular telephone 103a may be a so-called "smart phone" or other similar device such as a tablet computer. Smart phone 103a includes complete cellular telephone capability, but may perform many other functions as well, for example running application programs that provide a host of capabilities. A touchscreen 201 or other kind of display may be provided, on which a keypad 202 may be emulated. Cellular telephone 103a also includes a microphone and speaker (not shown) for use as a telephone. In some embodiments, a call to response center 102 may be initiated by activating a software application on telephone 103a, for example by actuating a control in the user interface shown on touchscreen 201.

Figure 2B:
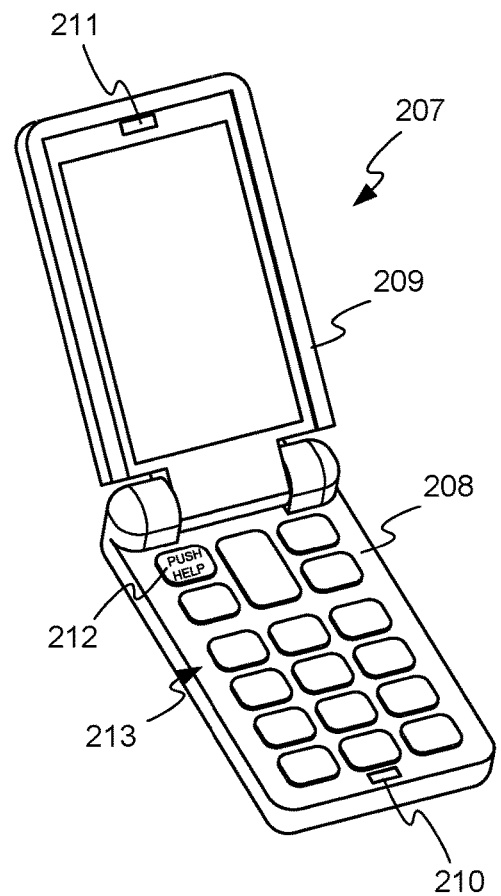

FIG. 2B illustrates another kind of mobile device 207 usable in embodiments of the invention. Device 207 is in the form of a "flip" phone, having a keypad portion 208 and a display portion 209 that swivel with respect to each other, so that the phone folds for storage and carrying, but unfolds for use. A microphone 210 and speaker 211 are conveniently positioned for telephone communication. A designated shortcut key 212 may be used to contact response center 102 directly, while keypad 213 enables calling other telephone numbers.

Figure 2C:
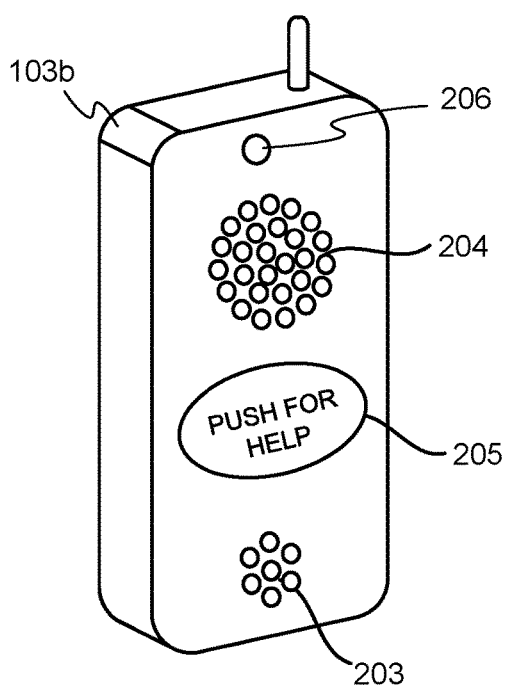

FIG. 2C illustrates simplified mobile communicator 103b in more detail. Simplified communicator 103b may be especially useful for some clients of response center 102. Example mobile communicator 103b may internally be a fully-featured cellular telephone, but has a simplified input interface comprising one button 205 for initiating a call directly to response center 102. Simplified communicator 103b may also be referred to as a "fob" or an "emergency communicator." For the purposes of this disclosure, the term "telephone" is intended to encompass mobile communicator 103b. A client of private response center 102 may wear simplified communicator 103b on his or her person, and can use it to contact private response center 102 whenever assistance is needed. For example, simplified communicator 103b may be configured to dial private response center 102 when button 205 is pressed. This greatly simplified input interface may be especially helpful to clients with impairments such as poor vision or coordination that make it difficult to operate a conventional cellular telephone that has many small keys. The single-button input interface assures that private response center 102 will be called without the client having to press a sequence of keys. In an event where help is needed, the client may be distraught or disoriented, and the simplified input interface increases the chance of the client reaching private response center 102. For the purpose of this disclosure, a user interface is "simplified" if it does not provide for the dialing of arbitrary telephone numbers.

Simplified communicator 103b further includes a microphone 203 and a speaker 204, enabling telephone or telephone-like communication. In some embodiments, simplified communicator 103b does not include a display, although one may be included on which messages can be shown to the user. In some embodiments, simplified communicator 103b may include an indicator light 206 or other visual indicator. Indicator light 206 may be used, for example, to indicate that the device is active, connected on a call, or the like.

Other kinds of devices may be used in embodiments of the invention, for example a "puck" phone, a device with a sliding cover, or another kind of device. In any event, a device used by clients of PRC 102 may be specially programmed to interact with computer system 106, to facilitate the service provided by PRC 102. For example, a device such as device 103a or 103b may periodically ascertain its geographic location, and may report its location immediately upon being connected with PRC 102 or at other times. The reporting may be by any suitable means, such as a text message to PRC 102, a data call to PRC 102, tones transmitted over the voice connection using dual tone multiple frequency (DTMF) tones, or the like. The client's geographic location may then be provided to customer service representative 104 receiving the call, and this information may assist customer service representative 104 in providing aid to the client. Determining the geographic location of the device is sometimes referred to a geolocation. The device may use any of a number of different techniques for geolocation. For example, a device may include a global positioning system (GPS) receiver, and may use signals from the constellation of GPS satellites to determine an accurate absolute position of the device.

A client's device may send other kinds of information to PRC 102 as well. For example, the device may detect any number of different kinds of events affecting the device or its user, and may report the events to PRC 102. The reported events may include such events as the device has been plugged in for battery charging;
the device has been removed from a battery charger;
the battery charge level of the device is below a threshold charge level;
the device has not moved for a predetermined time;
the device has detected a possible fall on the part of the device user;

the device has detected that it is away from its usual location;

the strength of the cellular signal received by the device has changed; and the device has just been turned on after being off.

Many other kinds of events may be envisioned and reported. Events may be reported via SMS message, data call, voice call, or other means. An event report may require sending a small amount of data to PRC 102, for example a handful of bytes to a kilobyte or more, depending on the kind of event being reported.

All or nearly all of the functions of a device such as device 103a or 103b depend on resources such as battery charge, cellular network connectivity, or access to a GPS or other geolocation signals, or other resources. Embodiments of the invention allow a device to conserve its resources or to gain access to resources that may be unavailable to it, either temporarily or permanently. These goals are accomplished by sharing resources among a number of devices that are in communication with each other, and can perform functions on each other's behalf.

For example, a obtaining a GPS fix is a battery-intensive operation. In embodiments of the invention, a first device that is low on battery charge may request that a second device nearby that has ample charge obtain a GPS fix on behalf of the first device, thus conserving the remaining charge in the first device.

In another example, sending event notifications to PRC 102 is also a battery-intensive operation, because the cellular transceiver of the device must be energized. It is desirable to send event notifications to PRC 102 often, to provide continuous monitoring and support of clients of the service offered by PRC 102. However, it is also desirable to minimize energy use, so that a client's device can provide service for as long as possible between chargings. Previous devices have taken approaches such as batching of event notifications, to minimize the number of times battery-intensive reports are performed.

In embodiments of the invention, devices cooperate to share resources, enabling more complete service and overall conservation of resources. For example, a first device low on battery charge may request that the second device forward an event notification to PRC 102 on behalf of the first device. The notification content may be communicated to the second device via a low power local communication link that uses less energy than a cellular call. Thus, the battery charge in the first device is conserved, because the second device makes the battery-intensive cellular call.

In other embodiments, the first device may simply not have access to resources such as cellular connectivity, a GPS signal, or other resources. For example, the first device may be in a cellular "dead spot" within a building, while a second device nearby may have a usable cellular connection, and may be reachable via the low power local link. The first device may request that the second device forward event notifications simply because the first device cannot at the moment.

Figure 3:
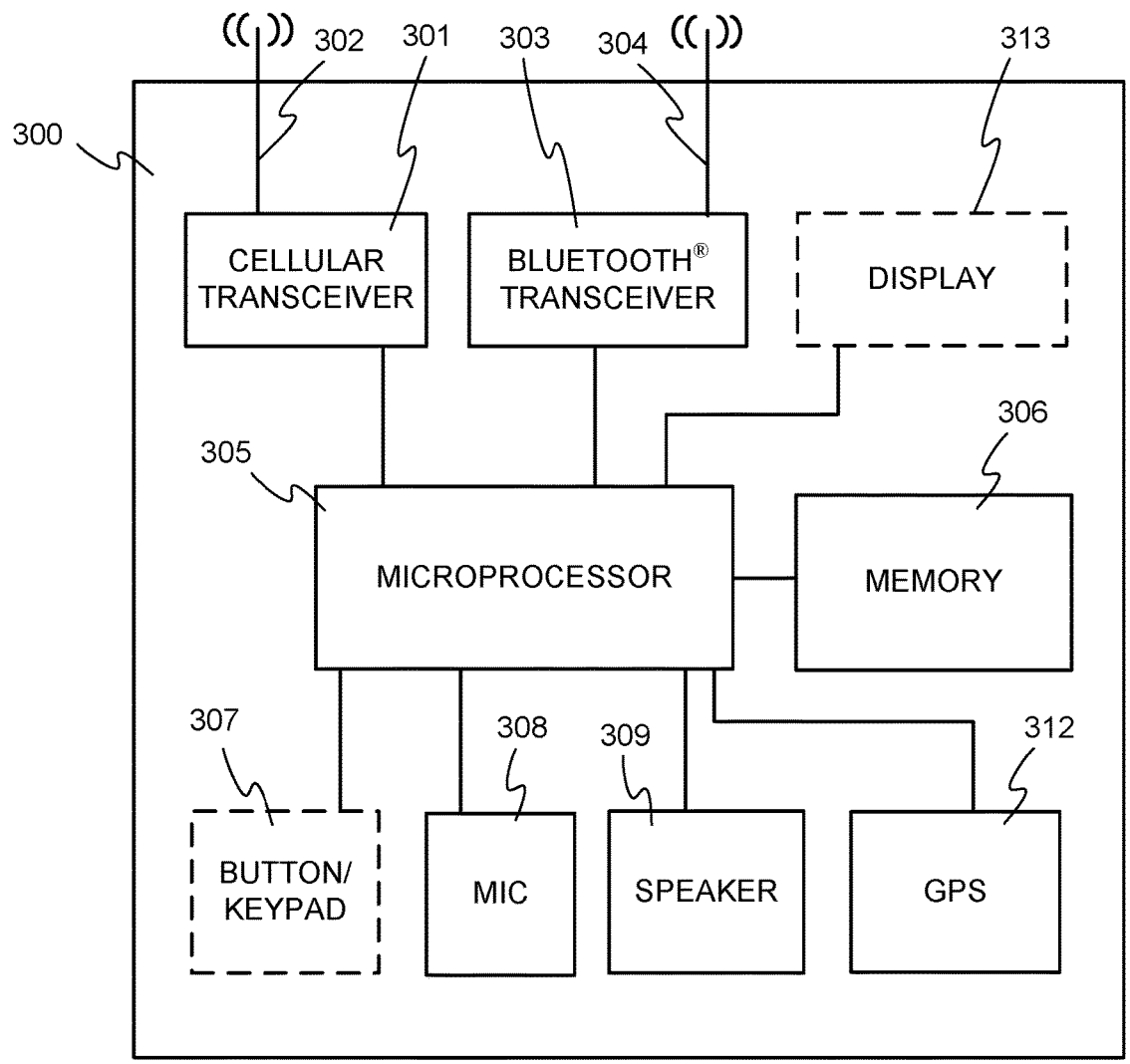
FIG. 3 illustrates a simplified schematic diagram of a communications device in accordance with embodiments of the invention.

FIG. 3 illustrates a simplified schematic diagram of example electronic architecture of a communications device 300 usable in embodiments of the invention. Device 300 may be configured as a smart phone such as smart phone 103a, a fob such as fob 103b, a flip phone such as flip phone 207, or another kind of device. Device 300 includes a cellular telephone transceiver 301 and antenna 302 for communicating via a cellular telephone network such as network 105. Cellular telephone transceiver 301 is an example of a wide area communications interface. Example device 300 also includes a Bluetooth® transceiver 303 and antenna 304, which are an example of a local wireless communications interface.

Example device 300 includes a microprocessor 305 that controls the operation of device 300, in accordance with instructions stored in a memory 306. Memory 306 may include volatile memory, nonvolatile memory, or a combination of these, and may store user data, application programs, temporary variables, and a variety of other kinds of information.

Depending on the particular configuration of example device 300, a button or keypad 307 may be provided. Device 300 includes a microphone 308 and speaker 309, for voice communication. Device 103b may also include a global positioning system (GPS) receiver 312, for receiving signals from GPS satellites, enabling device 300 to accurately ascertain its geographical location when enough GPS satellites are "visible" to device 300. Device 300 may use GPS information in a variety of ways, for example to transmit its location periodically or when requested to PRC 102, as part of a client monitoring service offered by the operator of PRC 102. More information about the operation and possible use of GPS information by a communication device can be found in U.S. Pat. No. 8,489,066 issued Jul. 16, 2013 and titled "Systems and Methods for Identifying Caller Locations", the entire disclosure of which is hereby incorporated by reference herein.

A display 313 may optionally be present, for example if device 300 is a smart phone or similar device. Display 313 may be a touchscreen display, enabling entry of information or commands into device 300.

Other features may be present in device 300 as well, for example one or more other kinds of local wireless communication transceivers such as a ZigBee®, NFC™, Wi-Fi™, ANT™, or Z-Wave® transceiver. Device 300 may include an accelerometer, the output of which can be analyzed to detect possible falls on the part of a user of device 300, the activity level of the user of device 300, or of other purposes. Many other features are possible.

Figure 4:
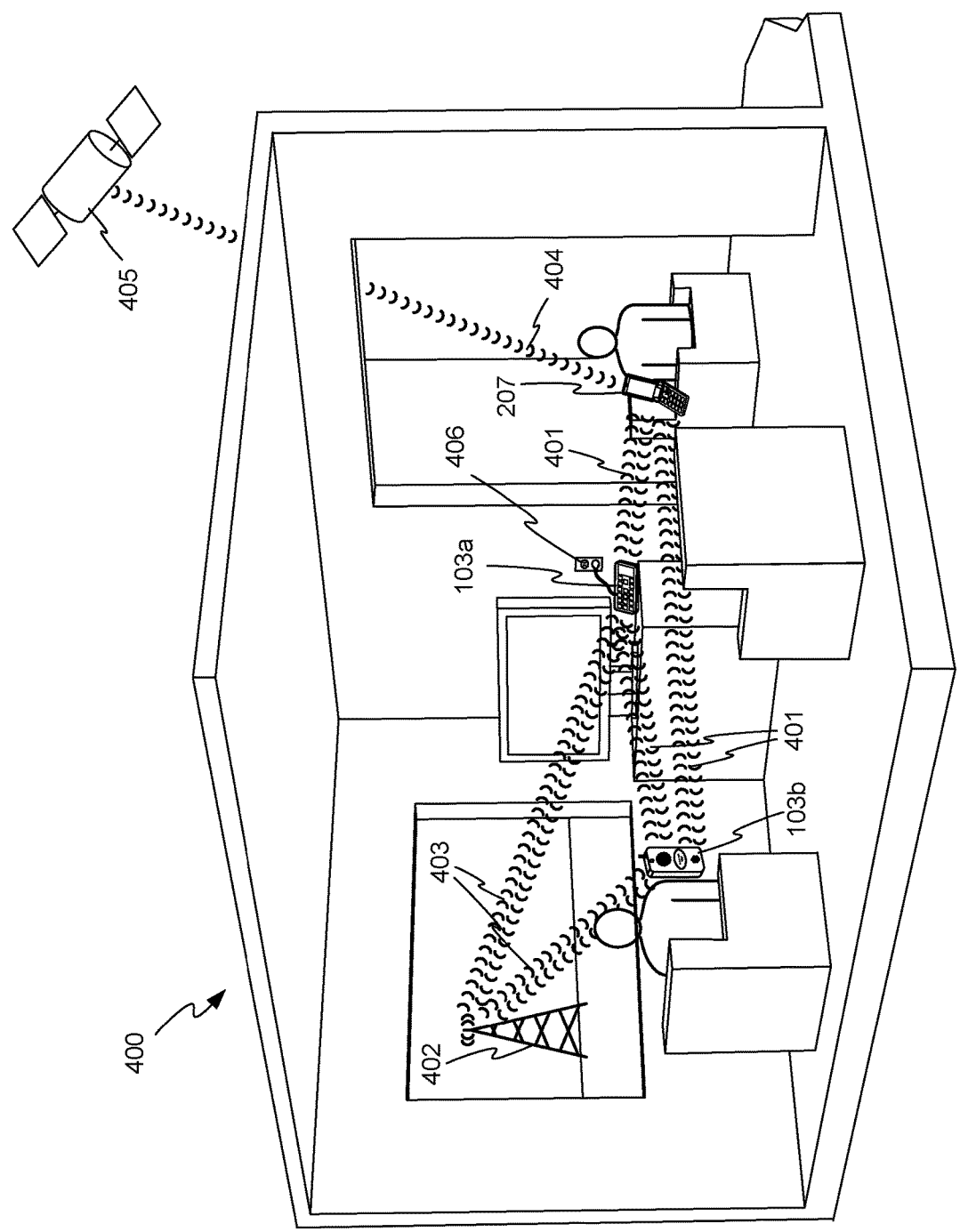
FIG. 4 illustrates an environment in which embodiments of the invention may find utility.

FIG. 4 illustrates an environment in which embodiments of the invention may find utility. Three different communications devices are present in household 400—smart phone 103a, simplified fob 103b, and flip phone 207. While three different kinds of devices are shown, any combination of suitably-programmed devices may be present, in any workable number. For example, two or more members of household 400 may be clients of the service offered by PRC 102, and each client may have a communications device in accordance with embodiments of the invention.

Smart phone 103a, fob 103b, and flip phone 207 all include local wireless communications interfaces, and can communicate directly with each other, as shown at 401. The local wireless communication interfaces may be, for example Bluetooth® interfaces. The local wireless communications interfaces may preferably be low power local wireless communications interfaces, such as Bluetooth® LE (low energy) interfaces. Other kinds of interfaces may be used. The local wireless communications interfaces permit peer-to-peer communication over a relatively short distance, for example up to 100 feet or more, but do not provide wide area communication.

Each of devices 103a, 103b, and 207 also includes a wide area communications interface—in this example cellular telephone transceivers such as transceiver 301 shown in FIG. 3. Two of the devices, smart phone 103a and fob 103b, are in communication with cell tower 402, as shown at 403, enabling them to communicate via the cellular network with other devices nearly anywhere. However, flip phone 207 is in a location where communication with cell tower 402 is not possible. For example, flip phone 207 may be behind an obstruction that blocks signals from cell tower 402. On the other hand, flip phone 207 is in a position to receive global positioning signals 404 from satellites 405 (only one of which is shown), while smart phone 103a and fob 103b cannot receive these signals. For example, smart phone 103a and fob 103b may be indoors, while flip phone 207 is on an outdoor patio with an unobstructed view of the sky.

Smart phone 103a is plugged in to mains power outlet 406, while fob 103b and flip phone 207 are operating on battery power alone. For example, the client who is the user of smart phone 103a may have connected it to mains power to recharge its battery.

Thus the availability of resources varies between devices 103a, 103b, and 207. Smart phone 103a has essentially unlimited energy available and can connect to cell tower 402, but cannot receive global positioning signals. Fob 103b can connect to cell tower 402, but is operating on battery power and thus has limited energy available. Fob 103b also cannot receive global positioning signals. Flip phone 207 can receive global positioning signals, but has no cellular telephone connectivity and is operating on battery power.

According to embodiments of the invention, devices 103a, 103b, and 207 can establish communications among themselves using their local wireless communications interfaces, and negotiate for a device having more availability of a resource to perform a task on behalf of another device that has less availability of the resource. Thus, the resources available to the various devices can be shared, improving the effectiveness of the service offered by PRC 102.

For example, the battery charge level of fob 103b may drop below a predetermined threshold charge level. This transition constitutes an event to be reported by fob 103b to PRC 102. Fob 103b could make a data call through cell tower 402 to report the event to PRC 102, or could send an SMS or other text message. However, the act of reporting the low battery charge level would further exacerbate the low charge condition, because communication with cell tower 402 is a relatively power-intensive operation. According to embodiments of the invention, devices 103a, 103b, and 207 have established communications between them. Fob 103b sends a message to smart phone 103a via the local wireless communications interface, requesting that smart phone 103a report the event on behalf of fob 103b. Smart phone 103a can accept the request, since smart phone 103a has cellular connectivity and ample power available. Smart phone 103a thus replies to fob 103b that smart phone 103a will send the event notification.

Preferably, fob 103b sends the content of the event notification to smart phone 103a for forwarding to PRC 102. The content may be, for example, a sequence of bytes or characters in a preselected format understood by PRC 102. Before being sent to PRC 102, an identifier of fob 103b may be included in the sequence, so that PRC 102 can determine that the event notification originated from fob 103b, even though it is received from smart phone 103a.

Because communication over the local wireless communications interface requires less power than communication with cell tower 402, fob 103b is able to report its event while conserving its scarce battery resource, without any significant burden on smart phone 103a.

As part of the communication between smart phone 103a and fob 103b, these devices may exchange information about their resource availability. For example, smart phone 103a may report that it has ample power and cellular connectivity, so that fob 103b "knows" that the request is likely to be accepted. In other embodiments, a device that is the subject of a request may simply accept or decline the request based on its own internal assessment of its resource availability. For example, a device without cellular connectivity may decline to forward an event notification. Similarly, a device with low battery charge may decline to provide assistance, to avoid draining its own battery.

In some embodiments, a device making a request may poll the other visible devices until it receives an acceptance of the request. If no acceptance is received, the device may attempt to perform the pertinent function itself, if possible, despite the fact that the function will consume scarce battery charge or other resources. In other embodiments, the devices may exchange information about their resource availability, and a device may be selected to be the subject of a request based on a determination that it has the most available pertinent resources, or at least ample resources.

In another example, smart phone 103a may be scheduled to obtain a position fix, as part of its ongoing monitoring of its geographic location. However, smart phone 103a cannot obtain a fix directly because it is not receiving location signals 404 from satellites 405. In this scenario, smart phone 103a requests assistance from flip phone 207, which can receive location signals 404. Because smart phone 103a and flip phone 207 are close enough together to communicate using their local wireless communications interfaces, it may be assumed that a position fix obtained by flip phone 207 is sufficiently accurate to represent the location of smart phone 103a. Flip phone 207 may obtain a new fix upon receiving the request from smart phone 103a, or may simply transmit its most recent position information. In some embodiments, when smart phone 103a transmits its geographic location to PRC 102, for example when the user of smart phone 103a places a call to PRC 102, it may indicate that the position fix was obtained on its behalf by flip phone 207. Thus, a customer service representative at PRC 102 can consider that the position fix received from smart phone 103a may not be as precise as if smart phone 103a had obtained the fix on its own, and may be inaccurate by up to the range of the locale wireless communications interfaces.

In yet another example, fob 103b may be scheduled to obtain a position fix and report its location to PRC 102, but fob 103b cannot receive position signals 404. In this case, fob 103b may request a position fix from flip phone 207. And if fob 103b is low on battery charge, it may request that smart phone 103a forward the position fix to PRC 102 on behalf of fob 103b. Thus, the user of fob 103b can continue to take full advantage of the service provided by PRC 102, while conserving the dwindling battery charge in fob 103b.

While GPS is discussed above as an example system for obtaining a position fix, other methods may be used, and are also subject to the availability of resources. For example, other global navigation satellite systems (GNSS) exist and may be used, for example, the GLONASS system operated by Russia, and the Galileo system operated by the European Union and the European Space Agency. In addition, other kinds of location services are available. For example, a device may ascertain its location by requesting a location fix from cellular network 105, which in turn may locate the device by trilateration between cellular towers. However, this technique requires cellular connectivity. In other embodiments, a device may obtain its geographical location from a location service that provides location based on the known locations of wireless "hotspots" used for Internet access. This technique may require local wireless connectivity in accordance with IEEE 802.11, such as connectivity, which can also be a shared resource in accordance with embodiments of the invention.

In another example, the user of flip phone 207 may wish to call PRC 102, and may press key 212 as shown in FIG. 2B, designated for calling PRC 102. Because flip phone 207 is not in communication with cell tower 402, the call will not go through via the cellular transceiver of flip phone 207. However, flip phone 207 may contact smart phone 103*a* or fob 103*b* using its local wireless communications interface, to request that smart phone 103*a* or fob 103*b* relay the call to cell tower 402. For example, assuming that smart phone 103*a* is enlisted, flip phone 207 can transmit audio from the microphone of flip phone 207 to smart phone 103*a* via Bluetooth® or another local interface. Smart phone 103*a* can place a call to PRC 102 using the cellular transceiver of smart phone 103*a*, re-transmitting the audio to PRC 102 in a voice call. Audio from PRC 102 is transmitted via the cell network to smart phone 103*a*, which re-transmits it to flip phone 207 via the local wireless communications interface. The user of flip phone 207 may perceive the call as being handled normally, and can receive vital assistance that may otherwise have been unavailable.

Devices embodying the invention are preferably programmed to implement resource sharing with other similarly-programmed devices. In some embodiments, appropriate instructions may be loaded into memory 306 at the time each device is made. In other embodiments, instructions may be installed in a device at a later time, for example during a firmware update, or as part of the purchase of a new service feature.

The resource sharing may be implemented in any suitable way. For example, in some embodiments, one device may serve as a clearinghouse for managing the resources of itself and other nearby devices. The clearinghouse device may poll other devices in the vicinity and collect resource information from each one, including such items as the battery charge level of each device, the existence and strength of cellular connectivity, access to global positioning signals, and the like. A device lacking in a resource needed for a particular function may contact the clearinghouse device for assistance, and the clearinghouse device may delegate performance of the function to a device known to have good availability of the necessary resource. For example, a device with low battery charge may request assistance with sending an event notification, and the clearinghouse device may refer the request to a nearby device that is currently plugged into mains power.

However, in a preferred embodiment, the devices are similarly-programmed peers that cooperate without the need for a central clearinghouse device. In this arrangement, the devices make themselves discoverable to each other using their local wireless communications interfaces 303. The devices pair with each other as well, either upon discovery or as needed for communications. The programming of each device guides the device in deciding when to request the assistance of another device for performing a function, when to accept a request from another device for performing a function, and what interactions are needed between the two devices and PRC 102 for performing specific functions.

Figure 5:
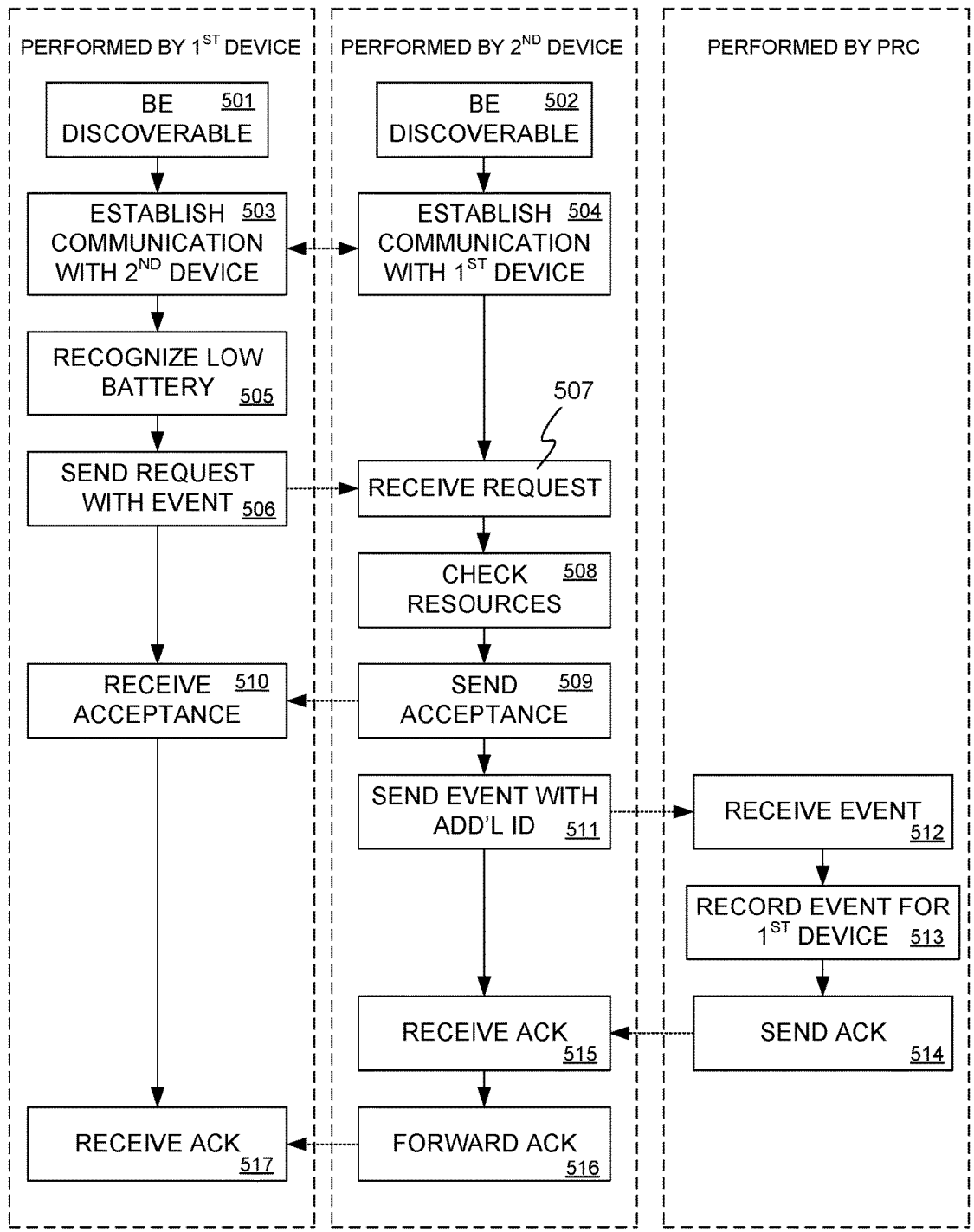
FIG. 5 illustrates an example interaction in accordance with embodiments of the invention.

FIG. 5 illustrates one example interaction between two devices and PRC 102 in accordance with embodiments of the invention. In steps 501 and 502, the two devices make themselves discoverable to each other using their local wireless communications transceivers. In steps 503 and 504, the devices pair with each other. For example, the first device in FIG. 5 may be fob 103*b*, and the second device may be smartphone 103*a*, shown in FIG. 4.

At step 505, the first device recognizes that its battery charge is low, but that it is scheduled to send an event notification to PRC 102. For example, the first device may consider that its battery charge is low when the charge level falls below a threshold value such as 50%, 30%, 20%, 10%, of full charge, or another level.

At step 506, the first device sends a request to the second device to assist with reporting of the event. In this example, the request includes the content of the event notification. In other embodiments, the request may be only an inquiry as to whether the second device is available for assistance, and the content of the event may be sent later upon acceptance of the request by the second device. At step 507, the second device receives the request.

At step 508, the second device checks the status of its own resources that may be needed to fulfill the request. For example, for the request to forward an event notification, the second device may verify that it has cellular connectivity, and that its own battery charge is sufficient to fulfill the request without significantly jeopardizing its own ability to provide service to its user. The second device may consider that its battery charge is sufficient when it exceeds a threshold such as 50%, 75%, 90%, or another threshold. The threshold may be configurable, based on user preference. For example, a user wishing to be parsimonious with the resources of the second device may instruct his or her device to accept assistance requests only when the battery charge level of the second device exceeds a high threshold, for example 90%, or when the second device is plugged in to mains power. Another user may instruct his or her device to accept requests more generously.

In the example of FIG. 5, the second device sends an acceptance of the request at step 509, and the acceptance is received by the first device at step 510.

At step 511, the second device then sends the event notification to PRC 102, for example via cellular transceiver 301. The event data is preferably coded with a header or other identifier indicating that the event information originated from the first device. PRC 102 receives the event notification at step 512, records it at step 513 in the records associated with the first device, and sends an acknowledgment at step 504 to the second device.

The second device receives the acknowledgment at step 515, and forwards it at step 516 to the first device, which receives the acknowledgment at step 517. Presuming that the first device receives the acknowledgment, the first device can consider that its event notification was successfully recorded.

If the first device does not receive the acknowledgment within a specified time period, it may re-try sending the event notification on its own, through the second device again, or through another device if one is available.

In the example of FIG. 5, the second device accepted the assistance request at step 509. In other scenarios, the second device may not accept a request, for example because it lacks the resources needed to fulfill the request (such as cellular connectivity global positioning information), or its own resources (such as battery charge) are too low to fulfill the request without compromising its own performance. In that case, the first device may seek out another device from which to request assistance, if any such devices are available. Or the first device may perform the function on its own if possible, for example when there is no other alternative way to accomplish the function without depleting its own resources.

Figure 6:
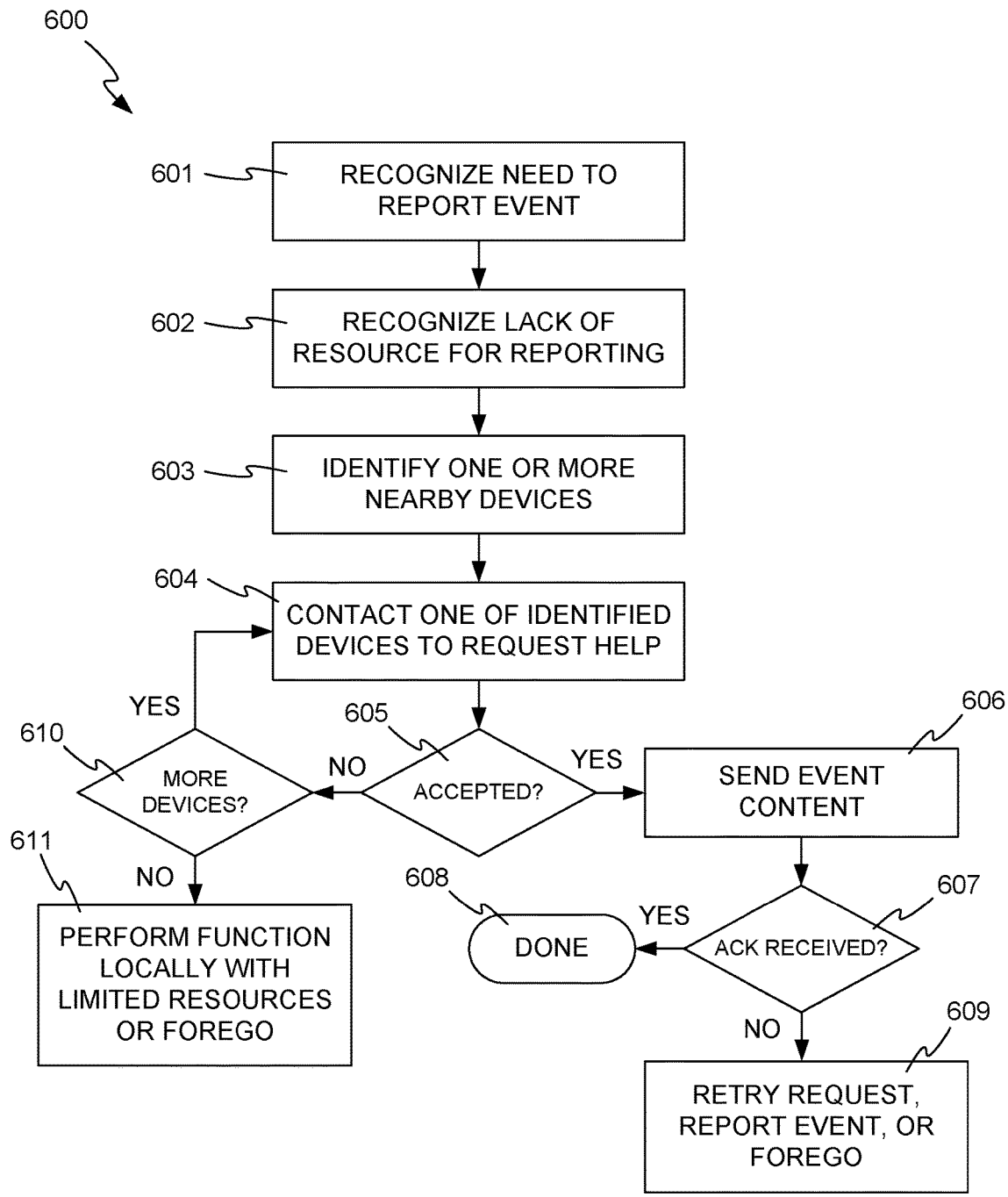
FIG. 6 is a flow chart of steps performed by a communications device in accordance with embodiments of the invention.

FIG. 6 shows a flow chart 600 depicting steps performed by a communications device such as fob 103*b* in accordance with embodiments of the invention. In step 601, the device recognizes the need to perform a function, for example to report an event to PRC 102. Some events may require transmitting data to PRC 102, while others may require only transmitting a code or identifier indicating that something occurred. For example, to report that the device has been placed on a battery charger, a simple code may suffice, but to report the level of charge in the device's battery, a variable numerical value may be transmitted.

At step 602, the device recognizes a lack of availability of a resource needed to report the event. For example, the device may have low battery charge, or may lack cellular connectivity. At step 603, the device identifies one or more nearby devices, for example other devices indicating their presence by emitting discovery signals using a local wireless communications interface such as Bluetooth®.

At step 604, the device contacts one of the identified nearby devices to request assistance. The contact may take the form of a message sent to the other device via the local wireless communications interface. The message should contain enough information to indicate that it is a request for assistance with a particular kind of function, so that the other device can evaluate whether it is able to perform the function. For example, the message may include a text string such as REQUEST:123:REPORTEVENT. This string identifies that it is a request for assistance (REQUEST), provides an identifier of the current interaction or incident (123), and identifies the kind of assistance required (REPORTEVENT). The receiving device can evaluate whether it has sufficient battery power and cellular connectivity to perform the function.

If so, the receiving device may send an acceptance message, such as ACK:123:ACCEPT. This message identifies the current interaction or incident with the requesting device (123), and indicates that the device that is the target of the request can render assistance. At step 605, the requesting device determines whether its request has been accepted. If so (as is the case in this example), control passes to step 606, in which the requesting device sends the content of the event report to be sent to PRC 102. For example, the requesting device may send a text string such as EVENTDATA:123:555-555-5555:EVENTCODE:23. This string indicates that it contains data for au event report, and identifies the current interaction with the other device. The string also provides an identifier of the requesting device (555-555-5555) for forwarding to PRC 102 to indicate that the event report originates from the requesting device rather than from the assisting device. Finally, the string includes a code indicating the kind of event (23) that occurred. In this example, no variable numerical value is needed.

At step 607, the requesting device determines whether an acknowledgment of the report has been received within a reasonable time. For example, once the event report has been sent to PRC 102 and acknowledged by PRC 102, the assisting device may send a text string such as ACK:123:COMPELTE, to indicate that the function requested in interaction or incident 123 has been completed. The requesting device can consider the event successfully reported at step 608. If no acknowledgment is received, the requesting device may try again to obtain assistance with sending the event report, may try to send the report using its own limited resources, or may simply forego sending the report, as shown at step 609.

The interaction or incident number may serve as a unique identifier of each incident for which help was requested, and may also enable PRC 102 to filter out duplicate event reports or other items. For example, a device that has requested assistance may retry sending an event report if it does not receive an acknowledgment. However, it is possible that the event report was successfully delivered to PRC 102, and the acknowledgment from PRC 102 did not reach the requesting device for some reason. Thus, a retry may result in a duplicate event report reaching PRC 102. PRC 102 may use the incident number or another kind of unique identifier in a report to identify duplicate reports. Duplicate reports are preferably acknowledged to the sending device.

If the requesting device does not accept the request, control passes from step 605 to step 606. If more devices are nearby from which assistance may be requested, the requesting device can try them until an acceptance is received. If no acceptance is received, the device may attempt to report the event using its own limited resources, if possible, or may simply forego reporting. For example, if the device requested assistance only because its battery charge was low, the device may report the event itself. However, if the device requested assistance because it lacked cellular connectivity, then the device may simply forego the reporting.

Figure 7:
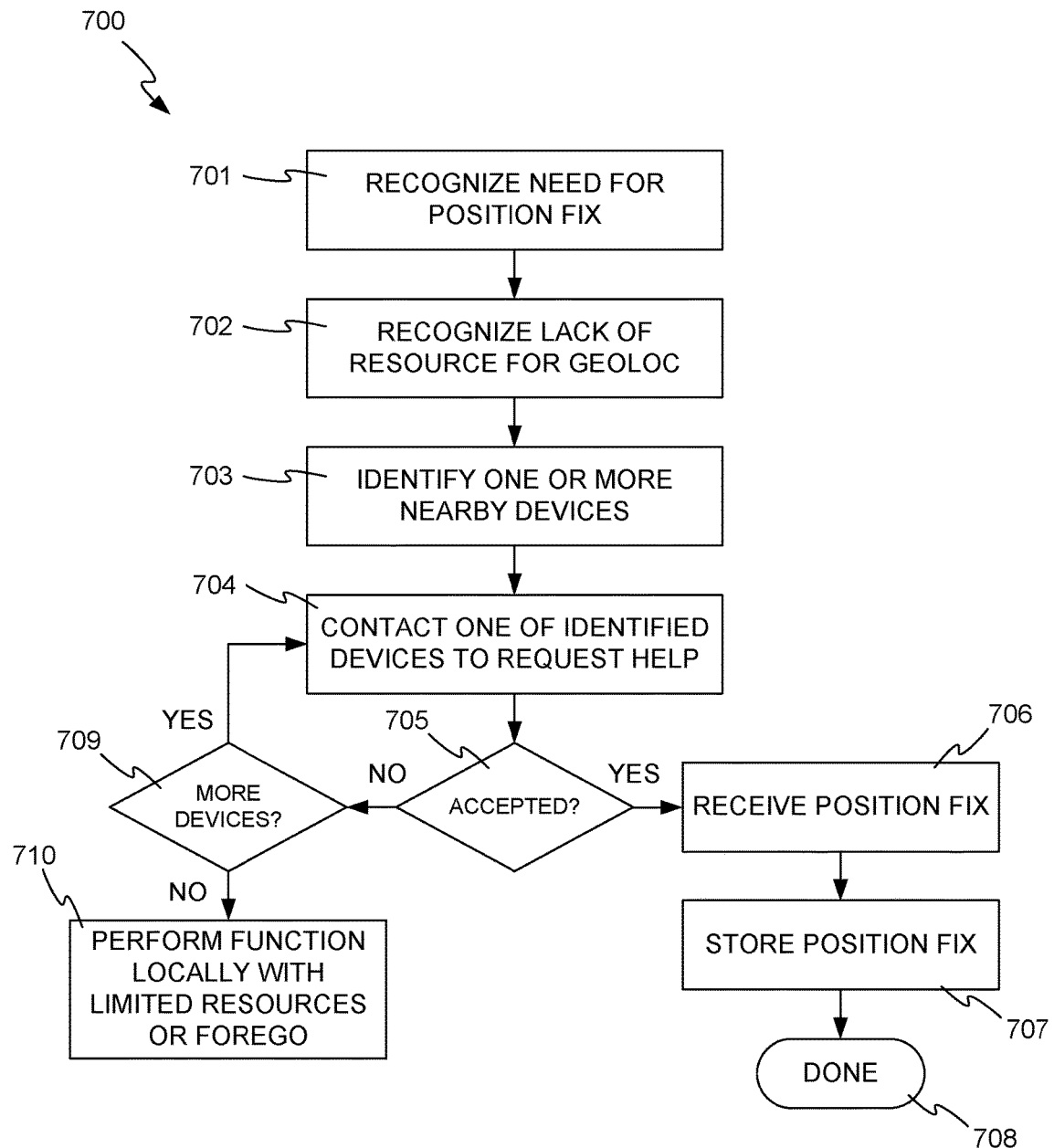
FIG. 7 is a flow chart of steps performed by a communications device in accordance with other embodiments of the invention.

FIG. 7 shows a flow chart 700 depicting steps performed by a communications device in accordance with other embodiments of the invention The example of FIG. 7 differs from the example of FIG. 6 in that two devices cooperate to perform a function that does not require any interaction with PRC 102. The example function is the obtaining of a position fix.

In step 701, the device recognizes the need to obtain a position fix. At step 702, the device recognizes a lack or low availability of a resource needed to obtain the fix. For example, the device may have low battery charge, or may not be receiving global positioning signals. At step 703, the device identifies one or more nearby devices, for example other devices indicating their presence by emitting discovery signals using a local wireless communications interface such as Bluetooth®.

At step 704, the device contacts one of the identified nearby devices to request assistance. For example, the requesting device may send a character string such as REQUEST:234:POSFIX. This string identifies that it is a request for assistance (REQUEST), provides an identifier of the current interaction (234), and identifies the kind of assistance required (POSFIX). The receiving device can evaluate whether it has sufficient battery power and GPS or other signal to perform the function.

If so, the nearby device may send a simple acceptance message, as in method 600, or may obtain the position fix and reply with the requested information. For example, the assisting device may return a text string such as ACK:234:ACCEPT:POSDATA:XXXXXX. This message identifies the current interaction with the requesting device (234), and indicates that the device that is the target of the request can render assistance, and in fact has obtained the position fix. The current location of the assisting device is returned as a variable value (XXXXXX).

Presuming an acceptance and requested data are received, at step 706, the requesting device stores the position fix at step 707 for possible future use, for example for sending to PRC 102 upon making a call to PRC 102. The requesting device can consider the position fix closed at step 708.

If the request for assistance is not accepted, the requesting device can attempt to obtain assistance from another device at steps 709, 704, and 705. If no device is found that will assist, then the requesting device may obtain the position fix itself, if possible, or simply forego the position fix, as shown at step 710.

Devices programmed to follow procedures such as those shown in FIGS. 6 and 7 may thus cooperate on a peer-to-peer basis to conserve resources, without the need for any clearinghouse device to maintain information about the capabilities of the various devices. Embodiments of the invention may permit devices to report events more frequently than devices not embodying the invention, or to report more kinds of events.

In some embodiments, users of devices may be able to enable or disable resource sharing with other devices. For example, a user who is concerned about other devices depleting the battery of his or her own device may not wish to participate in resource sharing. Similarly, a user who does not wish his or her information to be transmitted to other local devices may opt out of resource sharing. In some embodiments, resource sharing may be enabled or disabled upon enrollment in the service provided by PRC 102.

The messages and message formats described above are given by way of example only. Any suitable message format and content may be used.

Embodiments of the invention may also be used for administrative or other purposes. For example, a firmware update may be pushed to one device via the cellular network, and distributed to other nearby devices over the local wireless communications interface. Thus, on average, each device receiving the update may consume much less battery energy than if all of the devices received the update individually over the cellular network. In some cases, this arrangement may ensure that some devices receive the update that may otherwise not have. For example, a device lacking cellular network connectivity may receive an update locally.

While the principles of the disclosure have been described above in connection with specific apparatuses and methods, it is to be clearly understood that this description is made only by way of example and not as limitation on the scope of the disclosure. In addition, it is to be understood that all workable combinations of the features and elements disclosed herein are also considered to be disclosed.

What is claimed is:

1. A communications device, comprising:
a wide area communications interface;
a local wireless communications interface;
processor;
memory; and
a battery configured to power the wide area communications interface, the local wireless communications interface, the processor, and the memory, wherein the memory holds instructions that, when executed by the processor, configure the communications device to:
detect a first event occurring in the operation of the communications device;
establish a connection with a second device via the local wireless communications interface;
send, via the local wireless communication interface directly to the second device, a request for the second device to perform a particular function on behalf of the communications device, wherein the particular function comprises sending a report of the first event to an operator of a mobile personal emergency response service, and wherein the communications device does not contact the operator of the mobile personal emergency response service in relation to the request sent to the second device;
receive, via the local wireless communication interface from the second device, an indication that the second device will perform the particular function on behalf of the communications device;
receive, via the local wireless communication interface directly from a third device, a request for the communications device to perform a particular function on behalf of the third device, wherein the particular function comprises sending a report of a second event occurring in the operation of the third device;
send, via the local wireless communication interface from the communications device to the third device, an indication that the communications device will perform the particular function on behalf of the third device; and
send, via the wide area communications interface, to the operator of a mobile personal emergency response service, a report of the second event occurring in the operation of the third device.

2. The communications device of claim 1, wherein the instructions further configure the communications device to:
receive, from a fourth device via the local wireless communication interface, a request for the communications device to perform a particular function on behalf of the fourth device; and
send, via the local wireless communication interface from the communications device to the fourth device, an indication that the communications device will not perform the particular function on behalf of the fourth device.

3. The communications device of claim 2, wherein the instructions further configure the communications device to:
determine that the availability of a resource needed to perform the particular function with a threshold availability level; and
send the indication that the communications device will not perform the particular function on behalf of the fourth device in response to the determination.

4. The communications device of claim 1, wherein:
the instructions configure cause the communications device to recognize that the availability to the communications device of a resource needed to perform the particular function is below a threshold amount, and
the request for the second device to perform the particular function on behalf of the communications device is sent in response to the recognition that the availability to the communications device of a resource needed to perform the particular function is below a threshold amount.

5. The communications device of claim 4, wherein the resource is battery charge.

6. The communications device of claim 4, wherein the resource is wide area network connectivity.

7. The communications device of claim 4, wherein the resource is a geographic location signal.

8. The communications device of claim 1, wherein the wide area communications interface is a cellular telephone interface.

9. The communications device of claim 1, wherein the request includes data to be transmitted by the second device to the operator of the mobile personal emergency response service.

10. A plurality of communications devices, each of the plurality of communications devices comprising a respective wide area communications interface, local wireless communications interface, processor, memory, and battery configured to power the communications device, wherein the memories of the communications devices hold instructions that, when executed by the respective processors, configure the plurality of communications devices to:

detect events occurring in the operation of the communications devices;

establish peer-to-peer communications among the communications devices via the local wireless communications interfaces; and negotiate between first and second of the communications devices for the second communications device to perform a particular function on behalf of the first communications device, wherein performance of the particular function requires a particular resource more available to a second communications device than to the first communications device;

and wherein the particular function comprises sending a report of one of the events to an operator of a mobile personal emergency response service via the wide area communications interface of the second device;

and wherein in the reporting of the one of the events, the first communications device communicates only with the second communications device, and does not communicate with the operator of the mobile personal emergency response service.

11. The plurality of communications devices as recited in claim 10, wherein the particular resource is battery charge.

12. The plurality of communications devices as recited in claim 10, wherein the particular resource is wide area communications connectivity.

13. The plurality of communications devices as recited in claim 10, wherein the resource is a geographic location signal.

14. A communications device, comprising:
a wide area communications interface;
a local wireless communications interface;
processor;
memory; and
a battery configured to power the wide area communications interface, the local wireless communications interface, the processor, and the memory, wherein the memory holds instructions that, when executed by the processor, configure the communications device to:

establish a connection with a second device via the local wireless communications interface;

receive, via the local wireless communication interface from the second device, a request for the communications device to perform a particular function on behalf of the second device;

compare the availability of a resource needed to perform the particular function with a threshold level of availability; and send an acknowledgment to the second device indicating that the communications device will not perform the particular function on behalf of the second device;

wherein the threshold level of availability is adjustable by a user of the communications device.

15. The communications device of claim 14, wherein the resource is a resource selected from the set of resources consisting of battery charge, wide area network connectivity, and a geographic location signal.

16. The communications device of claim 14, wherein the particular function is the reporting of an event to a remote location.

17. The communications device of claim 1, wherein the first event is the detection of a possible fall on the part of a user of the communications device.

18. The communications device of claim 1, wherein the report includes data indicating that the report originated from the communications device.

19. The plurality of communications devices of claim 10, wherein the report includes data from the first communications device.

* * * * *